United States Patent Office 3,492,377
Patented Jan. 27, 1970

1

3,492,377
TRIARYL PHOSPHITES
Richard H. Kline, Cuyahoga Falls, Ohio, assignor to The Goodyear Tire & Rubber Company, Akron, Ohio, a corporation of Ohio
No Drawing. Original application May 22, 1961, Ser. No. 111,480, now Patent No. 3,244,661, dated Apr. 5, 1966. Divided and this application Feb. 1, 1966, Ser. No. 523,873
Int. Cl. C07f 9/12; C08c 11/66
U.S. Cl. 260—967           6 Claims Aralkyl substituted triaryl phosphites which may be used as stabilizer for rubbers.

---

This is a divisional application of co-pending application Ser. No. 111,480, filed May 22, 1961, now U.S. Patent 3,244,661.

This invention relates to a new class of compounds which has been found to have unusual ability to stabilize rubber. More particularly, it is directed to a unique class of triaryl phosphites which is useful in stabilizing rubber polymers. Various triaryl phosphites have, in the past, been employed as stabilizers for rubber. However, previously known compounds of this class, although reasonably successful stabilizers for rubber polymers, have nevertheless been subject to some rather serious limitations. One of the more serious limitations of the previously known members of this class of compounds, for example, triphenyl phosphite and the alkyl-substituted triaryl phosphites, is their susceptibility to hydrolysis in the presence of water. In the commercial production of synthetic rubber stabilizers are ordinarily incorporated into the polymer while it is in an aqueous medium in the form of latex, prior to coagulation and drying of the flocculated polymers. Since one of the most important functions of a rubber stabilizer is the protection of the raw polymers during drying and subsequent processing, it will be readily appreciated that a fundamental requirement of an effective rubber stabilizer is that it must be reasonably stable against hydrolysis and at the same time effectively stabilize the polymer, not only during processing, but during subsequent periods of storage which may in some cases extend for many months.

It is an object of this invention to provide a new class of triaryl phosphites that is particularly effective as stabilizers for rubber polymers. Another object of this invention is to provide a class of triaryl phosphites that will impart stability to rubber over a longer period of time than the previously known triaryl phosphites. A further object of this invention is to provide a class of triaryl phosphites that its highly resistant to hydrolysis.

In accordance with the present invention I have found that the foregoing and additional objects can be accomplished by employing as rubber stabilizers triaryl phosphites in which each aromatic ring contains one benzyl or alpha-methyl-benzyl substituent and wherein the aromatic rings may each be further substituted with one or more lower alkyl substituents. The compounds of this invention conform to the following structural formula

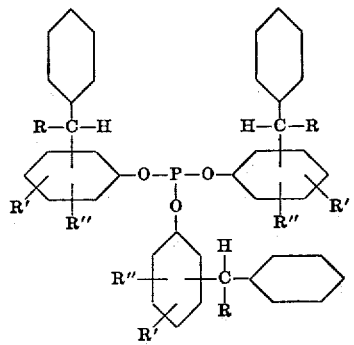

wherein R is a radical selected from the group consisting of hydrogen and methyl and wherein R' and R" are radicals selected from the group consisting of hydrogen and lower alkyl radicals containing from 1 to 5 carbon atoms.

Representative examples of compounds conforming to the above described formula are:

tri(4-α-methylbenzylphenyl)phosphite
tri(2-α-methylbenzyl-4-methylphenyl)phosphite
tri(2-benzyl-4-methylphenyl)phosphite
tri(2-methyl-4-α-methylbenzylphenyl)phosphite
tri(3-methyl-6-α-methylbenzylphenyl)phosphite
tri(2-methyl-4-benzylphenyl)phosphite
tri(3-methyl-6-benzylphenyl)phosphite
tri(2,4-dimethyl-6-benzylphenyl)phosphite
tri(2,5-dimethyl-4-benzylphenyl)phosphite
tri(2-benzyl-4-ethylphenyl) phosphite
tri(2-benzyl-4-butylphenyl)phosphite
tri(2,4-dibutyl-6-α-methylbenzylphenyl)phosphite
tri(2-α-methylbenzyl-4-amylphenyl)phosphite.

The triaryl phosphite stabilizers of the present invention may be made by any method known to the art. However, a preferred process for preparing the symmetrical triaryl phosphites consists of reacting at least 3 mols of a phenol having a benzyl or alpha-methylbenzyl substituent and optionally one or more lower alkyl substituents with one mol of a phosphorus trihalide, preferably phosphorus trichloride. The reaction is carried out under suitable reaction conditions which normally include conducting the reaction in an inert atmosphere such as nitrogen. After all of the reactants have been introduced, the reaction is conducted at a reaction temperature that does not substantially exceed 200° C. (preferably between 190° and 200° C.) until the evolution of hydrogen halide is complete.

The following examples are presented as illustrations of the preparation of typical triaryl phosphites of the present invention but they are not to be construed as limiting the scope of the invention.

EXAMPLE 1

A charge of 212 grams of 2-α-methylbenzyl-paracresol was introduced into a 50 milliliter reaction flask; 46 grams of PCl₃ were added to this charge over a ten-minute period. These reactants were mixed at room temperature with nitrogen being introduced below the surface of the reactants in order to sweep out HCl gas as it was formed. When all of the PCl₃ had been added the reaction mixture was heated for one hour at a maximum temperature of 200° C., nitrogen being continuously bubbled through the mixture. Volatile materials were then stripped off under vacuum at a pot temperature of 200° C. and 15 millimeters pressure. A theoretical yield of tri(2-α-methylbenzyl-4-methylphenyl) phosphite was obtained.

EXAMPLE 2

A mixture of triaryl phosphites was prepared in accordance with the following procedure: 445.5 grams of a 35/65 mixture of 2-benzyl-4-methylphenol and 3-methyl-6-benzylphenol were introduced into a 1-liter flask. The mixture was heated to 70° C. and 102 grams of PCl₃ were added slowly over an interval of 40 minutes. The reaction vessel was continuously flushed with nitrogen introduced below the surface of the reactants to aid in the removal of HCl gas. The mixture was heated to 200° C. in 30 minutes and maintained at this temperature for an additional 90-minute period. Volatile materials were stripped off under vacuum at 200° C. and 25-millimeters pressure. A theoretical yield of a mixture consisting of tri(2-benzyl-4-methyl-phenyl) phosphite and tri(3-methyl-6-benzylphenyl)phosphite was obtained.

EXAMPLE 3

A charge of 225 grams of 2-benzyl-4-methylphenol and 52.5 grams of PCl₃ were introduced into a one-liter reaction flask and reacted under the same experimental conditions as outlined in Example 1. A theoretical yield of tri(2-benzyl-4-methylphenyl)phosphite was obtained.

EXAMPLE 4

A mixture of triaryl phosphite was prepared by reacting 241.5 grams of mono-α-methylbenzyl derivative of USP cresol with 52.5 grams of PCl₃ following the same experimental conditions as outlined in Example 1. A theoretical yield of a mixture of triaryl phosphites was obtained.

EXAMPLE 5

A charge of 264.5 grams of 2-methyl-4-α-methylbenzylphenol was introduced into a one-liter reaction flask. Nitrogen was bubbled through the charge which was maintained at 65° C. and 57.5 grams of PCl₃ were added dropwise over a period of ten minutes. The reaction mixture was then heated for an additional 90 minutes at a maximum temperature of 200° C. with nitrogen bubbling continuously through the reactants. Volatile materials were removed by heating under vacuum at 200° C. and 12 millimeters pressure. A theoretical yield of tri(2-methyl-4-α-methylbenzylphenyl)phosphite was obtained.

Other compounds of this invention were prepared in a manner similar to the procedure outlined in the preceding examples.

The rubbers which may be conveniently protected by triaryl phosphites in accordance with this invention are natural rubber and those synthetic oxidizable rubbery polymers of conjugated dienes which are normally susceptible to deterioration by sunlight and atmospheric oxygen. By the term "oxidizable rubbery polymers of conjugated dienes" as employed in this application, is meant natural rubber and the synthetic rubbery polymers and copolymers of conjugated dienes. Representative examples of synthetic oxidizable rubbery polymers of conjugated dienes which are normally susceptible to deterioration by sunlight and atmospheric oxygen include polychloroprene; polyisoprene having essentially all of its units combined in a cis-1,4 structure; polybutadiene having essentially all of its units combined in a cis-1,4 structure; the rubbery copolymers of butadiene and styrene which may contain from 50 to 90% or more of butadiene; and butyl rubber which is a polymerization product of a major proportion of a mono olefin and a minor proportion of a multiolefin such as butadiene or isoprene.

The cis-1,4 polyisoprene rubber mentioned above may conveniently be produced in accordance with the procedures described in the following references:

(1) "Synthetic Natural Rubbers from Isoprene" Rubber and Plastic Age, vol. 39, No. 11, page 938 (1958) by Mayor, Saltman, and Pierson.

(2) "Cis-1,4 Polyisoprene Prepared with Alkyl Aluminum and Titanium Tetrachloride" Industrial and Engineering Chemistry, vol. 50, pages 1507–1510 (1958) by Adams, Stearns, Smith, and Binder.

The cis-1,4 polybutadiene rubbers mentioned above may conveniently be produced in accordance with the procedures described in the following references:

(1) "New Controlled-Structure Polymer of Butadiene" Rubber and Plastic Age, March 1961, pages 276–282 by W. W. Crouch.

(2) "1,4-cis Polybutadiene" Gummi und Asbest, vol. 13, page 1026 (1960).

The triaryl phosphite stabilizers of this invention may be used with or without other stabilizers, vulcanizing agents, accelerators or other compounding ingredients. In order to effectively stabilize raw rubber, small proportions of one or more of the triaryl phosphites in accordance with this invention are added to the rubber polymer in a customary antioxidant amount which may vary somewhat depending upon the type and requirements of the rubber articles to be produced. An aqueous oil emulsion of a rubbery butadiene-styrene polymer can be stabilized with from 1 to 10 percent of tri(2-α-methylbenzyl-4-methylphenyl)phosphite based on the weight of the polymer. The triaryl phosphites will generally be employed in an amount ranging from 0.25 to 5.0% by weight, based on the weight of the polymer, preferred concentrations generally range from 0.5 to 2.0% by weight, based on the weight of the polymer.

The stabilizers of the present invention may be used to stabilize any of the above-mentioned rubbers. They are particularly valuable as stabilizers for oil-extended rubbers prepared with any of the well-known extending oils in accordance with widely practiced commercial procedures. The triaryl phosphites of the present invention can be conveniently incorporated into rubber by any convenient method such as by adding them to the latex, adding them to a dilute cement prepared by dispersing the rubber in an inert solvent or by milling them into the coagulated polymer. A preferred method of incorporation consists of introducing a small amount of the stabilizer to the latex just prior to or concurrently with the addition of the acid-salt coagulant. It is frequently desirable to add the stabilizer in the form of an emulsion which may be prepared by mixing the triaryl phosphites with water and any of the conventional emulsifying agents such as the fatty acids or soaps. When the stabilizers of this invention are employed in stabilizing oil-extended rubbers they may be conveniently incorporated in emulsions prepared with a portion or all of the extending oil which is added to the raw polymers. When the stabilizers of this invention are employed to stabilize the cis-1,4 polyisoprene or cis-1,4 polybutadiene rubbers as described above, a convenient method of incorporation consists of adding the stabilizers to the inert organic solvent in which these polymers are prepared after the polymerization of the monomers is essentially complete.

The triaryl phosphites of this invention were tested as stabilizers for styrene-butadiene polymers in accordance with the following procedure:

EXAMPLE 6

One and twenty-five hundredths parts of the stabilizers shown in the following table were added to 100 parts of antioxidant-free styrene-butadiene polymer (SBR–1006—a hot styrene-butadiene rubber) which was prepared by the commercial acid-salt coagulation process. The polymer was dried in a vacuum oven at a temperature of 50° C. while the oven was flushed with nitrogen. The dried polymer was stored under nitrogen and refrigeration. Portions of the rubber were dissolved in benzene to form a cement containing approximately 3% rubber and the indicated stabilizers added thereto. The cements were poured onto aluminum foil so as to form very thin films of rubber when the benzene evaporated. After drying, the weight of the rubber was obtained in connection with each sample. Thereafter the foil with the adhering rubber film was placed in the oxygen absorption apparatus. The oxidation-resistant properties of various triaryl phosphites prepared in accordance with the present invention were compared with the oxidation-resistant properties of a well-known commercially available triaryl phosphite antioxidant. The data obtained are summarized in the following table:

TABLE I

| Sample No. | Antioxidant | Hours to absorb | |
|---|---|---|---|
| | | 0.5% $O_2$ | 1.0% $O_2$ |
| 1 | Tri(nonylphenyl)phosphite* | 140 | 145 |
| 2 | A 50/50 mixture of tri(2-α-methylbenzylphenyl)phosphite and tri(4-α-methylbenzylphenyl)phosphite. | 210 | 253 |
| 3 | Tri(2-methyl-4-α-methylbenzylphenyl)phosphite (Example 5). | 205 | 333 |
| 4 | Tri(2-α-methylbenzyl-4-methylphenyl)phosphite (Example 1). | 260 | 345 |
| 5 | A mixture of triaryl phosphites as prepared in Example 4. | 305 | 370 |
| 6 | Tri(2-benzyl-4-methylphenyl)phosphite (Example 3). | 340 | 430 |
| 7 | A mixture of triaryl phosphites prepared by reacting 3 mols of monobenzyl derivative of USP cresol with 1 mol of $PCl_3$. | 355 | 455 |

*A well-known commercially available antioxidant.

EXAMPLE 7

The test procedure outlined in Example 6 above was repeated using a second styrene-butadiene polymer (SBR 1508, a cold styrene-butadiene rubber). One and twenty-five hundredths parts of the stabilizers shown in the following table were added to 100 parts of the antioxidant-free polymer. The remarkable ability of a typical triaryl phosphite in accordance with the present invention to protect this rubber against oxidation is shown by the following data.

TABLE II

| Sample No. | Antioxidant | Hours to absorb | |
|---|---|---|---|
| | | 0.5% $O_2$ | 1.0% $O_2$ |
| 1 | Tri(nonylphenyl)phosphite* | 86 | 110 |
| 2 | Tri(2-α-methylbenzyl-4-methylphenyl)phosphite (Example 1). | 226 | 366 |

*A well-known commercially available antioxidant.

EXAMPLE 8

Separate samples of cis-1,4 polyisoprene rubber prepared following a procedure essentially as outlined in the reference by Mayor, Saltman and Pierson cited above, were stabilized against oxidation by incorporating 1.25 parts of the stabilizers shown in the following table per 100 parts of rubber. The stabilizers were dispersed in the benzene that was used to dilute the rubber solutions and thus form a cement which was then processed and tested in accordance with the procedure outlined in Example 6.

TABLE III

| Sample No. | Antioxidant | Hours to absorb 1.0% $O_2$ |
|---|---|---|
| 1 | Tri(nonylphenyl)phosphite* | 8 |
| 2 | A mixture of triaryl phosphites composed of 35% tri(2-α-methylbenzyl-4-methylphenyl)phosphite and 65% tri(3-methyl-6-α-methylbenzylphenyl)phosphite. | 41 |
| 3 | A mixture of tri(2-benzyl-4-methylphenyl)phosphite and tri(3-methyl-6-benzylphenyl)phosphite (Example 2). | 58 |

*A well-known commercially available antiodixant.

From the foregoing data it will be apparent that triaryl phosphites of the present invention are extremely effective in imparting oxidation resistance to rubber.

The superior resistance of triaryl phosphites of the present invention to hydrolysis is demonstrated by the following example.

EXAMPLE 9

A weighed sample (about 5 grams) of a triaryl phosphite ester as indicated in the following table was dissolved in 30 milliliters of isopropyl alcohol and the solution added to 100 milliliters of boiling water. Ten milliliter aliquots of this solution were removed at intervals and titrated with 0.1 N potassium hydroxide in isopropanol using bromphenol blue as the indicator. A curve was plotted showing the amount of acid liberated from the ester vs. time. The time for the acid concentration to reach 50% of its maximum value was taken as a measure of the hydrolytic stability of the triaryl phosphite ester. These values for a number of esters are presented in the following tables. Table IV shows the results obtained when a few drops of HCl were added to the ester prior to hydrolysis. Table V shows the data obtained from neutral systems.

Table IV

| Compound: | Minutes to 50% hydrolysis |
|---|---|
| Tri(nonylphenyl)phosphite* | 22 |
| Tri(2 - benzyl - 4 - methylphenyl)phosphite | 43 |
| Tri(4 - α - methylbenzyl - 4 - methylphenyl)phosphite | 43 |
| Tri(2 - α - methylbenzyl - 4 - methylphenyl)phosphite | 47 |
| A mixture of triaryl phosphites prepared by reacting 3 mols of mono-benzyl derivative of USP cresol with 1 mol of $PCl_3$ | 49 |
| A mixture of triaryl phosphites as prepared in Example 4 | 64 |
| A mixture of triaryl phosphites composed of 45% tri(2-α-methylbenzyl - 4 - methylphenyl)phosphite and 65% tri(3-methyl-6-α-methylbenzylphenyl)phosphite | 82.5 |

*A well-known commercially available antioxidant.

Table V

| Compound: | Minutes to 50% hydrolysis |
|---|---|
| Tri(nonylphenyl)phosphite* | 129 |
| A mixture of triaryl phosphites composed of 35% tri(2-α-methylbenzyl - 4 - methylphenyl)phosphite and 65% tri(3-methyl-6-α-methylbenzylphenyl)phosphite | 232 |

*A well-known commercially available antioxidant.

The present invention may be advantageously employed in the manufacture of rubber which is to be used for making a wide variety of articles including tires, tubes, shoes, all types of light-colored rubber articles, hose, coating compositions, etc.

While certain representative embodiments and details have been shown for the purpose of illustrating the invention it will be apparent to those skilled in this art that various changes and modifications may be made therein without departing from the spirit or scope of the invention.

What I claim is:

1. Triaryl phosphites conforming to the following structural formula

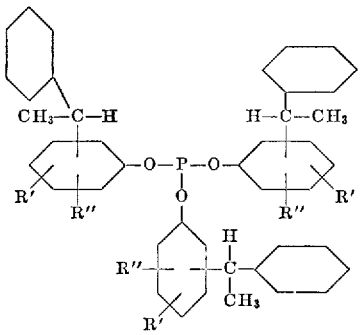

wherein R' and R" are radicals selected from the group consisting of hydrogen and lower alkyl radicals containing from 1 to 5 carbon atoms.

2. A triaryl phosphite in accordance with claim 1 wherein R' and R" are hydrogen.

3. A triaryl phosphite in accordance with claim 1 wherein R' and R" are methyl radicals.

4. A triaryl phosphite in accordance with claim 1 wherein R' is a methyl radical and R" is hydrogen.

5. The compound tri(2 - α - methylbenzyl - 4 - methylphenyl) phosphite.

6. The compound tri(4-α-methylbenzylphenyl) phosphite.

References Cited

UNITED STATES PATENTS 2,200,712   5/1940   Carswell _____ 260—967
2,419,354   4/1947   Howland et al.

CHARLES B. PARKER, Primary Examiner

ANTON H. SUTTO, Assistant Examiner

U.S. Cl. X.R.

260—29.7, 815, 820, 976

PO-1050
(5/69)

UNITED STATES PATENT OFFICE
CERTIFICATE OF CORRECTION

Patent No. 3,492,377                    Dated January 27, 1970

Inventor(s) Richard H. Kline

It is certified that error appears in the above-identified patent and that said Letters Patent are hereby corrected as shown below:

Abstract - page 1, line 15, "stabilizer" should read --stabilizers--.

Page 3, Example 1, line 3, "50" should read --500--.

Page 6, Table IV, line 52, "45%" should read --35%--.

SIGNED AND
SEALED
JUN 30 1970

(SEAL)
Attest:

Edward M. Fletcher, Jr.
Attesting Officer

WILLIAM E. SCHUYLER, JR.
Commissioner of Patents